United States Patent
Horn et al.

(10) Patent No.: US 8,606,798 B2
(45) Date of Patent: Dec. 10, 2013

(54) SYSTEMS AND METHODS FOR CREATING STANDARDIZED STREET ADDRESSES FROM RAW ADDRESS DATA

(75) Inventors: Gary Randall Horn, O'Fallon, MO (US); Thomas Francis McGeehan, V, Town & Country, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/421,977

(22) Filed: Mar. 16, 2012

(65) Prior Publication Data

US 2012/0239670 A1  Sep. 20, 2012

Related U.S. Application Data

(60) Provisional application No. 61/453,839, filed on Mar. 17, 2011.

(51) Int. Cl.
*G06F 17/30* (2006.01)

(52) U.S. Cl.
CPC ....... *G06F 17/30241* (2013.01); *Y10S 707/919* (2013.01); *Y10S 707/92* (2013.01)
USPC ............................. 707/756; 707/919; 707/920

(58) Field of Classification Search
CPC ................................................ G06F 17/30241
USPC ........................................................ 707/756
See application file for complete search history.

(56) References Cited

U.S. PATENT DOCUMENTS

| | | | |
|---|---|---|---|
| 5,524,227 A * | 6/1996 | Cuthbertson et al. ......... | 711/202 |
| 6,438,546 B1 | 8/2002 | Higgins | |
| 6,879,983 B2 | 4/2005 | Bellamy et al. | |
| 7,366,726 B2 | 4/2008 | Bellamy et al. | |
| 7,542,931 B2 | 6/2009 | Black et al. | |
| 7,693,853 B2 | 4/2010 | Bellamy et al. | |
| 7,752,132 B2 | 7/2010 | Stewart et al. | |
| 7,818,333 B2 * | 10/2010 | Biard et al. ................... | 707/763 |
| 7,917,544 B2 | 3/2011 | Bellamy et al. | |
| 8,055,497 B2 * | 11/2011 | Yazici ............................... | 704/9 |
| 8,271,525 B2 * | 9/2012 | Sharma et al. ................ | 707/771 |
| 8,321,393 B2 * | 11/2012 | Adams et al. ................ | 707/705 |
| 2002/0174148 A1 * | 11/2002 | Seidman ....................... | 707/517 |
| 2003/0225725 A1 * | 12/2003 | Miller et al. ...................... | 707/1 |
| 2005/0114201 A1 | 5/2005 | Walsh et al. | |

(Continued)

OTHER PUBLICATIONS

An International Search Report, dated Jun. 13, 2012, for co-pending PCT patent application No. PCT/US12/29497, filed Mar. 16, 2012.

*Primary Examiner* — Miranda Le

(74) *Attorney, Agent, or Firm* — Armstrong Teasdale LLP

(57) ABSTRACT

A method and system for processing raw address data using a computer device coupled to a database are provided. The method includes receiving, at the computer device, raw data from a first party, the raw data including a raw street address. The method includes formatting the raw street address using the computer device and separating the formatted street address into at least one token using the computer device wherein each token includes one or more characters indicating a portion of the raw street address. The method further includes creating a standardized street address from the at least one token based on one or more conditions, wherein the one or more conditions facilitate determining at least one of inclusion, exclusion, and position of the at least one token in the standardized street address.

8 Claims, 18 Drawing Sheets

(56) References Cited

U.S. PATENT DOCUMENTS

| | | |
|---|---|---|
| 2006/0206372 A1* | 9/2006 | Carpenter et al. ............ 705/10 |
| 2007/0174164 A1 | 7/2007 | Biffle et al. |
| 2007/0174208 A1 | 7/2007 | Black et al. |
| 2009/0092232 A1* | 4/2009 | Geldenbott et al. ........... 379/45 |
| 2009/0119093 A1 | 5/2009 | Yazici |
| 2011/0055252 A1 | 3/2011 | Kapochunas et al. |
| 2011/0098846 A1 | 4/2011 | Yeung et al. |
| 2011/0270808 A1 | 11/2011 | Faruquie et al. |
| 2011/0307476 A1 | 12/2011 | Sharma et al. |
| 2012/0016800 A1 | 1/2012 | Stewart et al. |
| 2012/0047179 A1 | 2/2012 | Faruquie et al. |

* cited by examiner

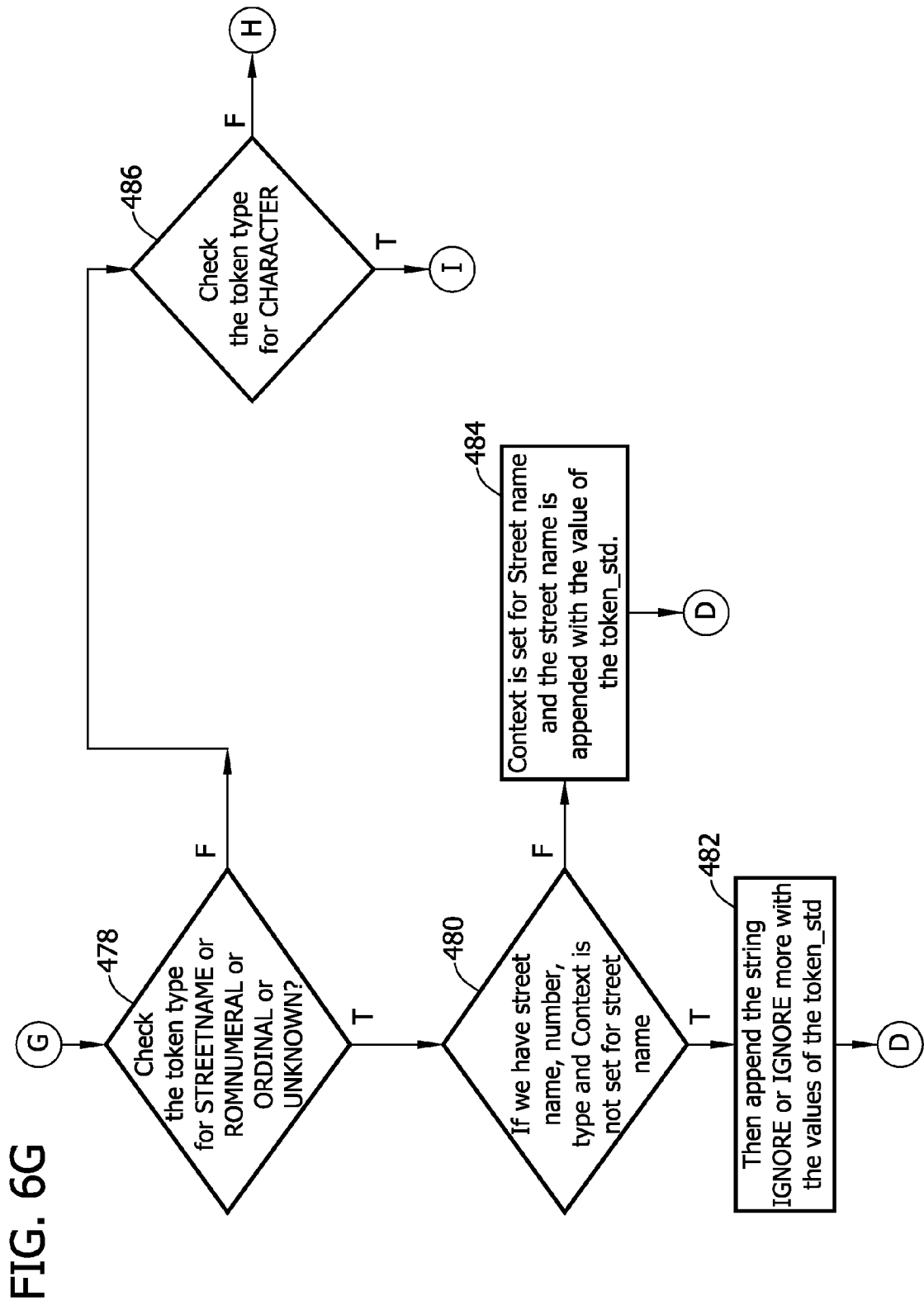

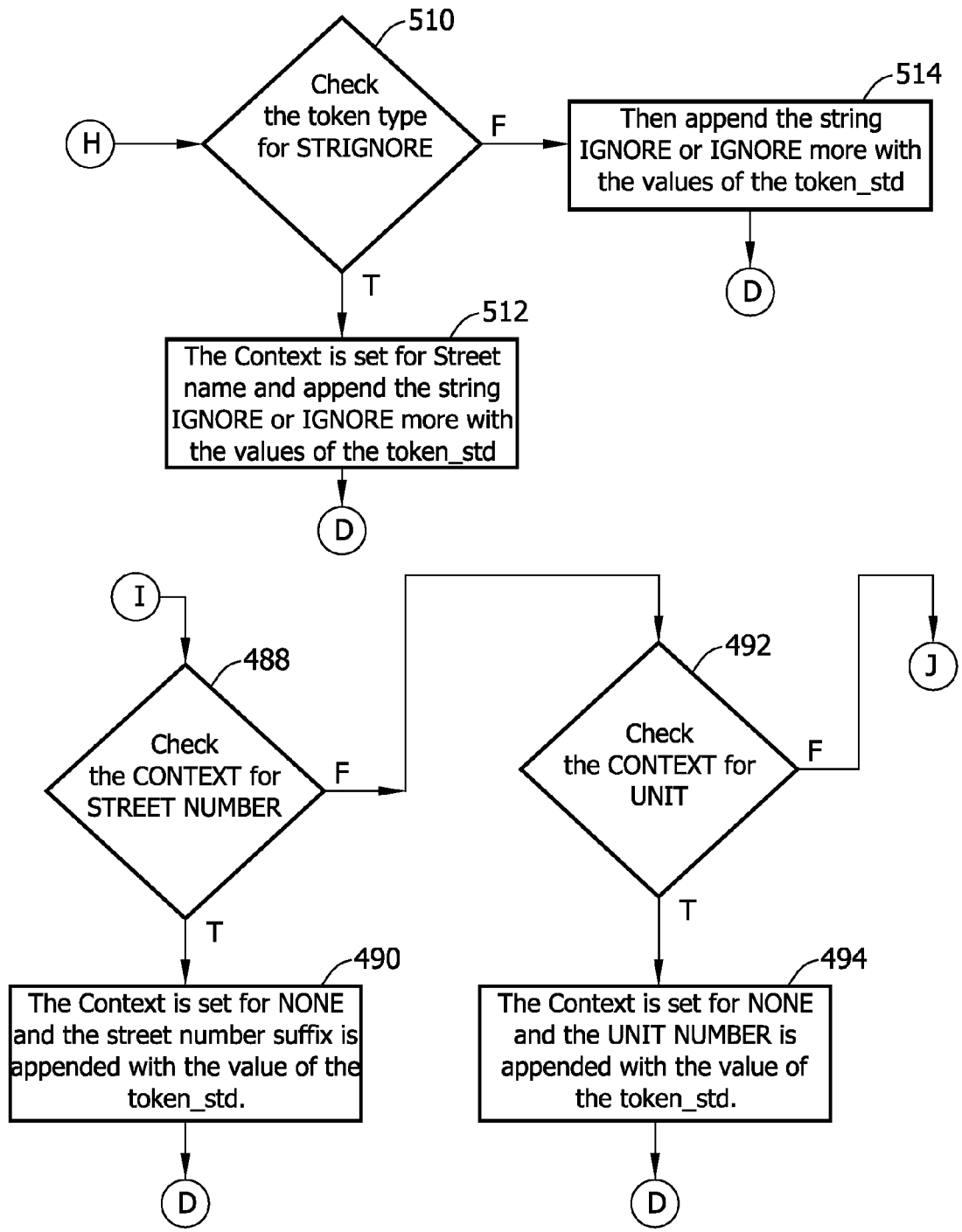

FIG. 7

| Country Code | Token | Token_std | TokenType | Rules |
|---|---|---|---|---|
| * | A | AVE | Type | |
| MEX | ACC | ACC | Unit | |
| * | AVE | AVE | Type | T:T |
| * | AVENUE | AVE | Type | T:T |
| * | DR | DR | Type | :S;T:T |
| * | DRIV | DR | Type | T:T |
| * | DRIVE | DR | Type | T:T |
| * | EXPRESSWAY | EXPY | Type | |
| * | EXIT | EXIT | NumberPref | |
| * | EXPW | EXPY | Type | |
| * | NUMBER | NO | Unit | |
| * | ROUTE | RT | Highway | |
| ITA | SEST | SEST | Type | |
| * | SEVEN | 7 | Number | |
| * | SEVENTH | 7 | Ordinal | |
| * | SS | SS | Highway | |
| * | ST | S | StreetName | S:T=ST;T:T=ST |
| * | STA | STA | StreetName | |

SYSTEMS AND METHODS FOR CREATING STANDARDIZED STREET ADDRESSES FROM RAW ADDRESS DATA

CROSS REFERENCE TO RELATED APPLICATIONS

This application claims the benefit of U.S. Provisional Patent Application No. 61/453,839 filed Mar. 17, 2011, which is hereby incorporated by reference in its entirety.

BACKGROUND OF THE INVENTION

This invention relates generally to processing raw data and, more particularly, to computer systems and computer-based methods for creating standardized street addresses from raw address data.

There are several forms of raw data associated with a payment-by-card transaction. Such raw data may be provided to and from a merchant, a merchant bank, a merchant processor, or other party involved in the payment-by-card transaction. The raw data may include a transaction identification number, a merchant identification number, an authorization code, address data, etc. Prior to authorizing and/or settling the transaction, one or more portions of the raw data is generally reconciled with one or more entries in a database to, for example, match portions of the merchant's raw data with data contained in a merchant database. The merchant database may be a repository of merchant specific data maintain by a merchant bank, issuer, or a merchant processor. Additionally, one or more parties may provide raw data unassociated with a transaction for reconciliation with data in the merchant database.

In processing the raw data from one or more merchants, the raw address data is often received in a variety of different formats, possibly depending on the merchant, country of origin, or type of merchant, etc. Raw street addresses, for example, may include special characters, a street number in different locations, directional indicators, apartment indicators, extraneous information, etc. Different matching methods have been employed to match raw address data to address data contained in a merchant database. In particular, known methods include term frequency/inverse document weighting, edit distances, and soundex for measuring similarities between two strings or records. Unfortunately, each of these known methods of matching data has limitations.

Accordingly, it would be desirable to provide a system and/or method for creating a standardized street address from a raw street address for comparison to data stored in a database.

BRIEF DESCRIPTION OF THE INVENTION

In one embodiment, a computer-based method for processing raw address data using a computer device coupled to a database includes receiving, at the computer device, raw data from a first party, the raw data including a raw street address. The method includes formatting the raw street address using the computer device and separating the formatted street address into at least one token using the computer device wherein each token includes one or more characters indicating a portion of the raw street address. The method further includes creating a standardized street address from the at least one token based on one or more conditions, wherein the one or more conditions facilitate determining at least one of inclusion, exclusion, and position of the at least one token in the standardized street address.

In another embodiment, a computer system for processing data includes a memory device and a processor in communication with the memory device and is programmed to receive raw address data from a first party wherein the raw address data includes a raw street address. The computer system is also programmed to format the raw street address by at least one of removing a non alpha-numeric character, replacing a non alpha-numeric character with a space, eliminating a leading space character, eliminating a redundant space character, inserting a space character between different types of characters, the different types of characters including at least one of a numeric type character, an alpha type character, and a non alpha-numeric type character, replacing a lower-case alpha character with an upper-case alpha character. The computer system is further programmed to separate the formatted street address into at least one token, each token including one or more characters indicating a portion of the raw street address and create a standardized street address from the at least one token based on one or more conditions, wherein the standardized street address includes data from the raw address data in consistent positions and excludes data that is inconsistent with predetermined standardized data, and wherein the one or more conditions facilitate determining at least one of indicative of inclusion, exclusion, and position of the at least one token in the standardized street address.

In yet another embodiment, one or more non-transitory computer-readable storage media has computer-executable instructions embodied thereon, wherein when executed by at least one processor, the computer-executable instructions cause the processor to receive raw address data from a first party, the raw address data including a raw street address and format the raw street address by at least one of removing a non alpha-numeric character, replacing a non alpha-numeric character with a space, eliminating a leading space character, eliminating a redundant space character, inserting a space character between different types of characters, the different types of characters including at least one of a numeric type character, an alpha type character, and a non alpha-numeric type character, replacing a lower-case alpha character with an upper-case alpha character. The computer-executable instructions also cause the processor to separate the formatted street address into at least one token, each token including one or more characters indicating a portion of the raw street address and create a standardized street address from the at least one token based on one or more conditions, wherein the standardized street address includes data from the raw address data in consistent positions and excludes data that is inconsistent with predetermined standardized data, and wherein the one or more conditions facilitate determining at least one of indicative of inclusion, exclusion, and position of the at least one token in the standardized street address.

BRIEF DESCRIPTION OF THE DRAWINGS

FIGS. 1-7 show exemplary embodiments of the methods and systems described herein.

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary system including a plurality of computer devices in accordance with one example embodiment of the present invention.

FIG. 3 is an expanded block diagram of an exemplary embodiment of a server architecture of the system including the plurality of computer devices in accordance with one example embodiment of the present invention.

FIG. 4 illustrates an exemplary configuration of a client system shown in FIGS. 2 and 3.

FIG. 5 illustrates an exemplary configuration of a server system shown in FIGS. 2 and 3.

FIGS. 6A-L show a flow diagram of a process performed using the system shown in FIGS. 2 and 3 in accordance with one example embodiment of the present invention.

FIG. 7 is an exemplary embodiment of a look-up table for use in the exemplary process of FIG. 6.

DETAILED DESCRIPTION OF THE INVENTION

Figure 1:
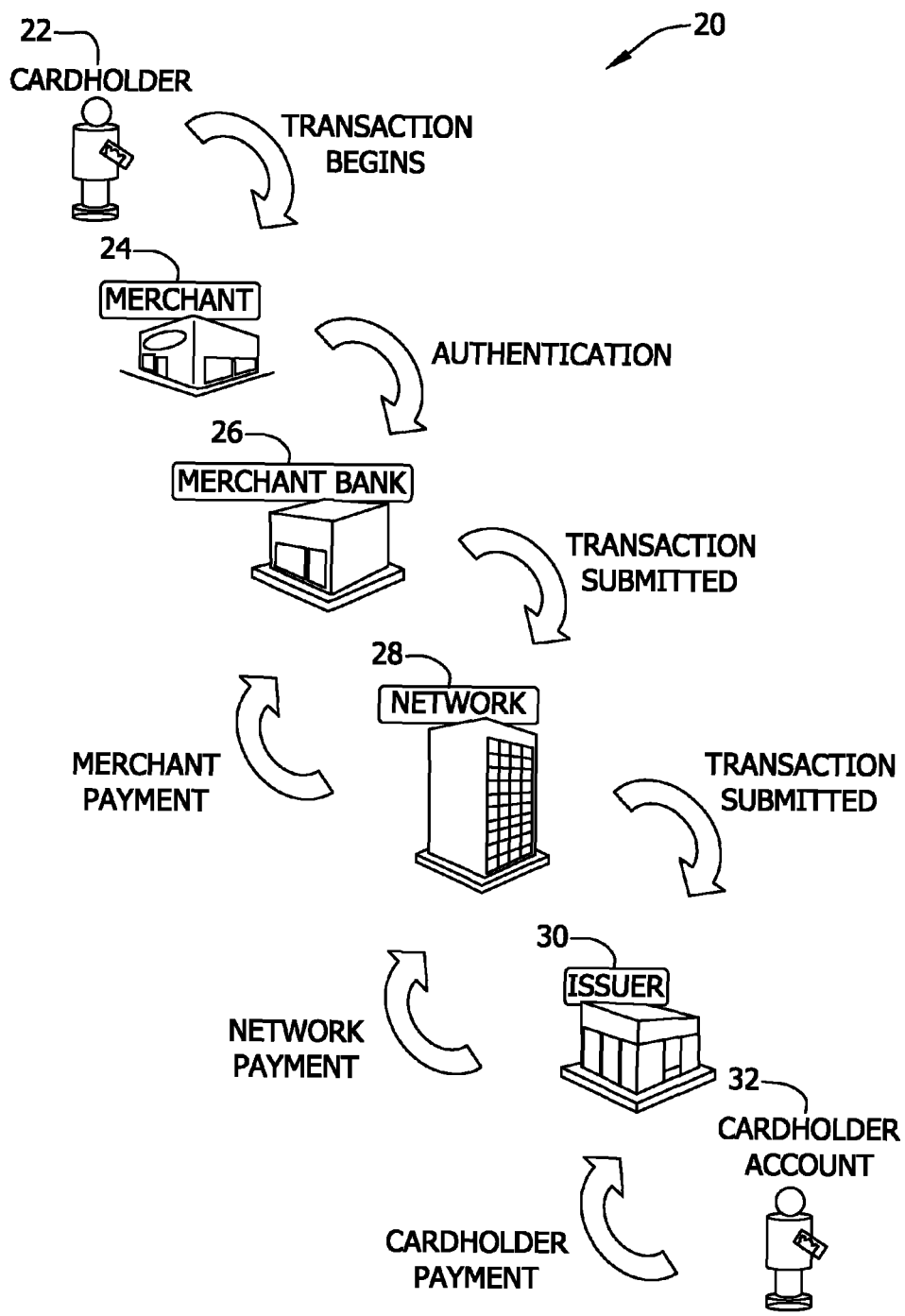

Embodiments of the methods and systems described herein relate to creating standardized street addresses from raw address data received from one or more merchants as part of processing a financial transaction that involves a financial transaction card. The embodiments employ rules and conditions to create and optimize a standardized street address by including essential data from the raw address data in consistent positions and excluding non-essential data. The rules and conditions may be altered to deal with changes in address formats, geographic regions, languages, etc., thereby providing flexible and/or adaptable methods or systems.

Once created, the standardized street address, or a portion thereof, may be stored in memory to compare or match with one or more standard street addresses stored in a merchant database. In this manner, raw address data received from a first party, such as a merchant, may be reconciled with data stored in the merchant database to clear a payment-by-card transaction, verify/check the status of one or more merchants, or other functions associated with matching raw address data to a merchant database.

The methods and systems described herein may be implemented using computer programming or engineering techniques including computer software, firmware, hardware or any combination or subset thereof, wherein the technical effect may include at least one of: (a) receiving raw address data from a first party, the raw address data including a raw street address, (b) formatting the raw street address, (c) separating the formatted street address into at least one token, and (d) creating a standardized street address from the at least one token based on one or more conditions, wherein the one or more conditions facilitate determining at least one of inclusion, exclusion, and position of the at least one token in the standardized street address.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
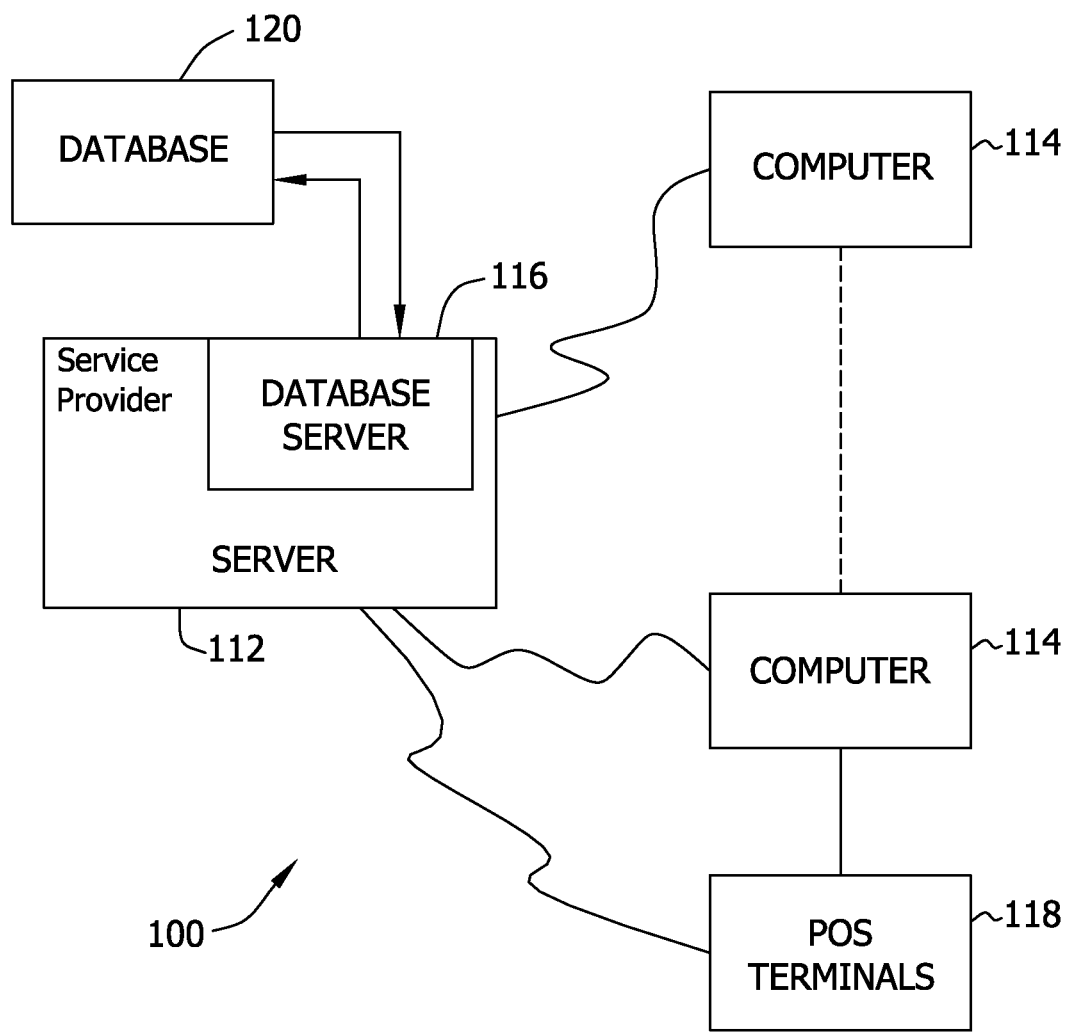

FIG. 2 is a simplified block diagram of an exemplary processing system 100 including a plurality of computer devices in accordance with one embodiment of the present invention. In the example embodiment, system 100 may be used for performing payment-by-card transactions and/or raw address data received as of part processing the financial transaction. For example, system 100 may store standard address data in a merchant database. The standard data may include, for example, a street name, a street number, a unit number, a unit name, a street direction, a street suffix, a street number prefix, and/or a floor number. System 100 may receive raw data as part of processing transactions. System 100 is configured to process raw address data and convert it into standardized data. The standardized data can then be compared to standard address data stored in a merchant database, such as database 120.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store raw address data, formatted address data, standardized address data, and/or standard address data associated with a customer, a merchant bank, a merchant, and/or issuer, or financial transaction, for processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment system, a biller, and/or a price tracking system. The price tracking system may be associated with interchange network 28 or with an outside third party in a contractual relationship with interchange network 28. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
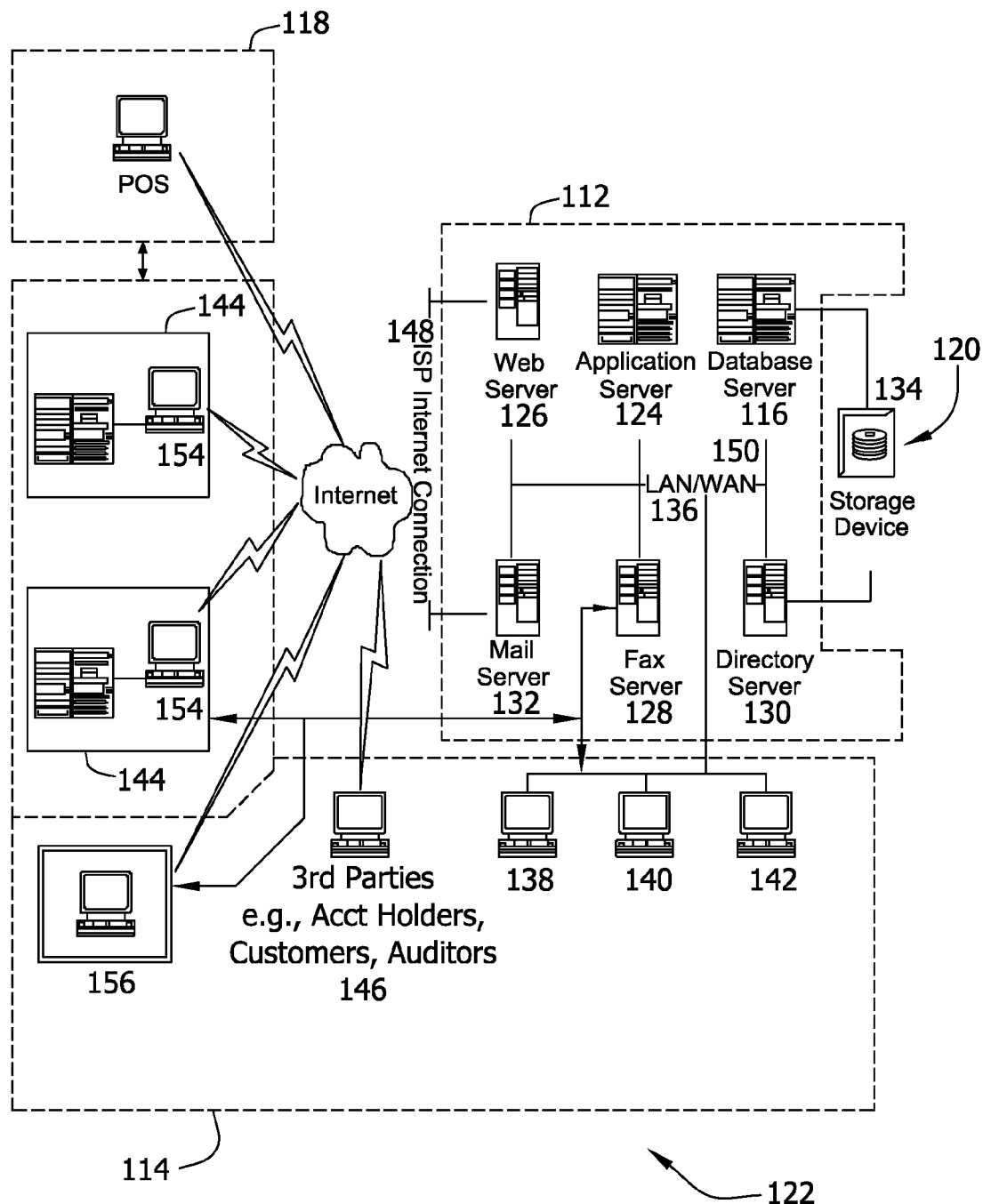

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
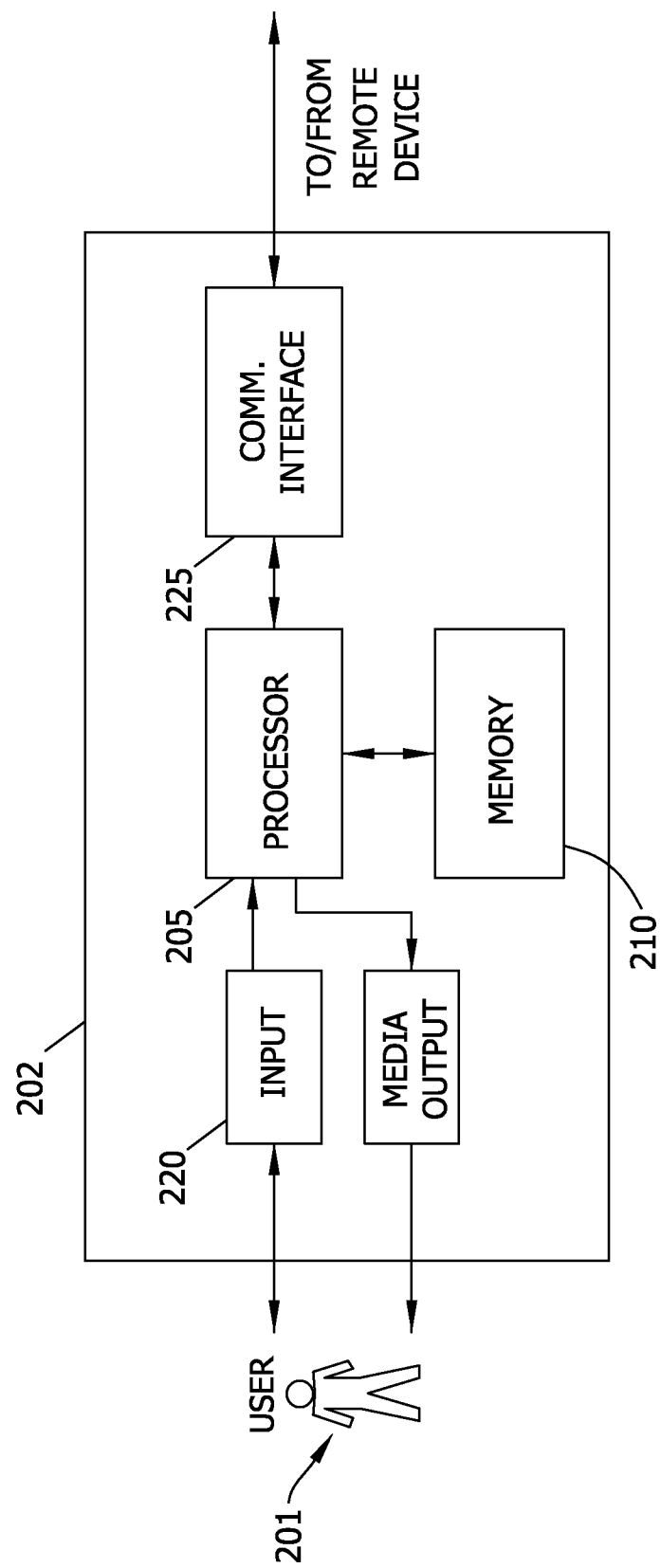

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
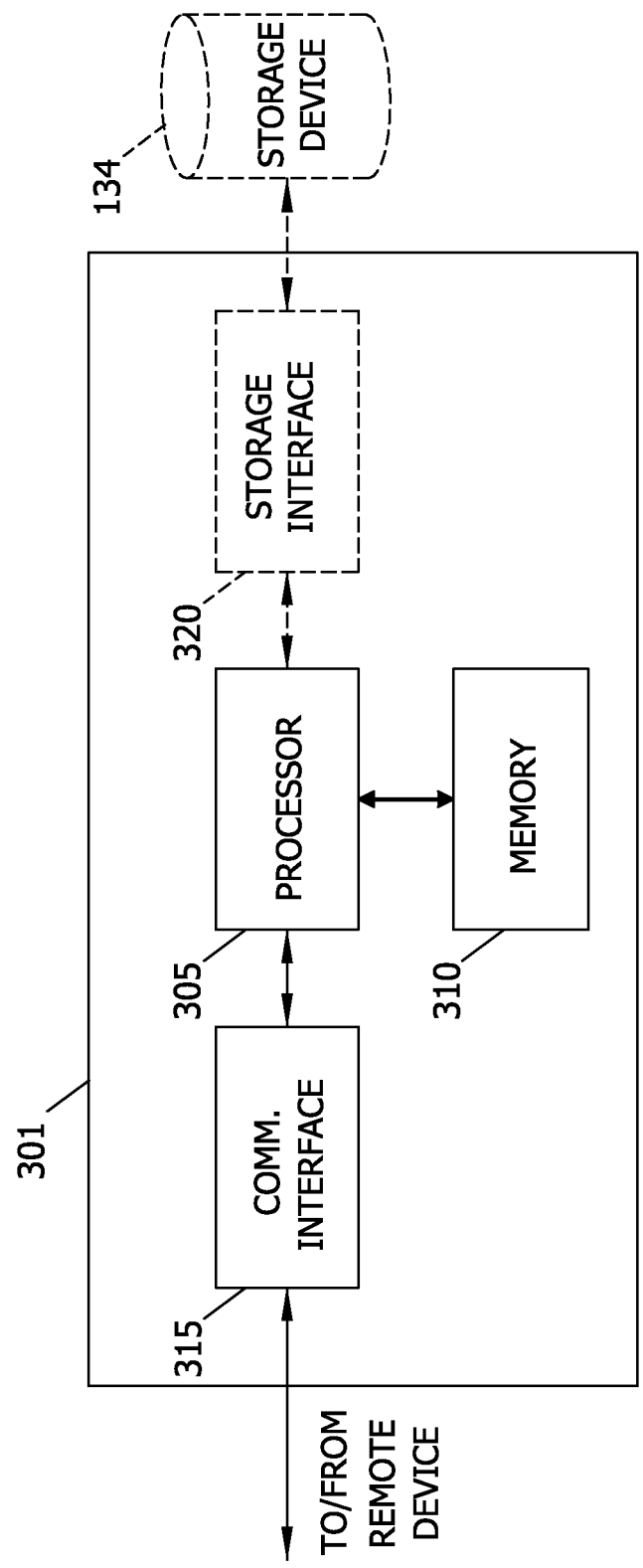

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

FIG. 6 illustrates a process 400 for processing raw data received from a first party according to one example embodiment of the present invention. The first party may include, for example, a merchant, an issuer, merchant processor, a customer or other party to a financial transaction. The example process receives raw address data, determines conditions included within the raw address data, employs actions based on the determined conditions, formats the raw street address data, separates the formatted street address into one or more tokens, creates a standardized street address, and stores the standard street address in memory for comparing at least a portion of the standardized street address with one or more standard street addresses stored in a database.

It should be appreciated that the conditions and/or actions illustrated in FIG. 6 (and a look-up table and rules therein as described below) are specific to the example embodiment presented herein. Various changes, additions, and/or subtractions may be implemented to alter the performance of the process and/or to accommodate changes in raw data received from one or more parties. For example, one or more conditions and/or actions may be altered to process raw address data from additional countries or in different languages. The ability to alter conditions, actions, look-up tables and/or rules included in a process provides broad flexibility in processing raw address data received from one or more parties.

The raw data may include a transaction identification number, a merchant identification number, an authorization code, and address data, etc. The raw address data is stored in a database, such as database 120, storage device 134, memory 210, and/or memory 310. The raw address data is accessible by processor 305 of the server system 301 for executing instructions to perform one or more of the processes described herein. Alternatively, or additionally, the raw address data may be accessible by processor 205 of the client system 201, or other processing device of system 100, for executing instructions to perform one or more of the processes described herein With reference to FIG. 6A, the example process 400 includes retrieving 402 raw address data from a database or another device. The raw address data includes a raw street address. The raw address data may also include information related to city, country, territory, province, country, zip code, or other information indicative of an address. Retrieving 402 the raw address data may include retrieving only the raw street address or retrieving more than the raw street address from which the raw street address may be subsequently extracted. In one example, the raw street address is retrieved by executing a search query on the raw address data stored in memory, such as database 120 or memory 210, 310.

As shown, the exemplary process also includes retrieving 404 a country code from the raw address data. The country code may be usable in subsequent processes for creating a standardized street address. The country code may be retrieved from the raw address data by fetching the country code from the raw address data or deriving the country code from the raw address data and/or a database of country codes. Additionally, or alternatively, the process may include retrieving a city, state, zip code, province, etc. In at least one embodiment, a country code may not be used to create a standardized street address, such that retrieving a country code may be omitted.

Once the raw street address is retrieved, the raw street address is formatted 406. In the example embodiment of FIG. 6, formatting 406 includes removing special characters (e.g., colon, semi-colon, comma, period, at sign, underscore, space, or other non alpha-numeric characters, etc.). When one of these special characters is removed, it is replaced with a space. Leading and redundant spaces are eliminated. The raw street address is further formatted 406 by inserting spaces between different types of characters, such as numeric characters, alpha characters, and special characters. For example, a space may be inserted between a numeric character and an alpha character (e.g., "2nd" is formatted to provide "2 nd"). Additionally, formatting 406 includes replacing lower-case alpha characters with upper-case alpha characters. Formatting 406 ultimately provides a formatted street address, consisting of numeric characters, alpha characters, and spaces. It should be appreciated, however, that the formatting types described above may be employed, alone or in combination, with one or more different formatting types in other embodiments.

Once formatted, process 400 includes separating 408 the formatted street address into tokens. In this particular embodiment, the formatted street address is separated at each space to form at least one token, which is stored in an individual string. For example, the formatted street address "121 1 ST AVE 2 ND FL" includes seven tokens, which are separated into seven individual strings. Separating 408 also includes determining the length of each of the token strings.

Figure 6A:
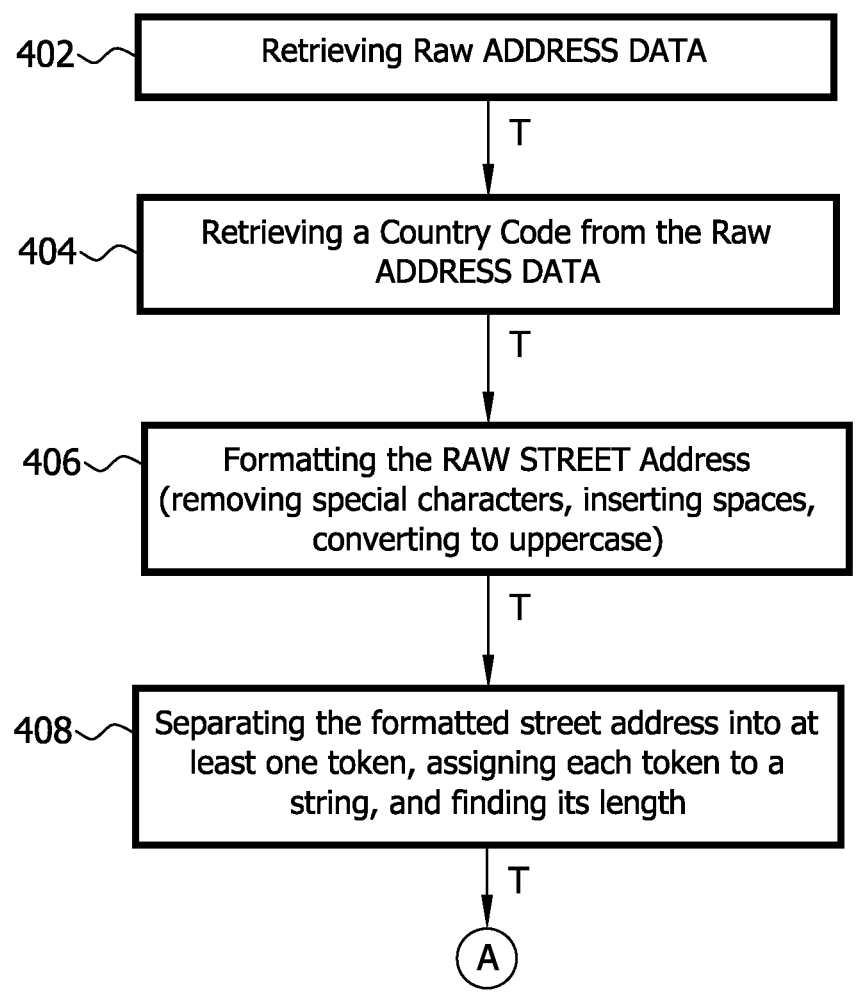
Figure 6B:
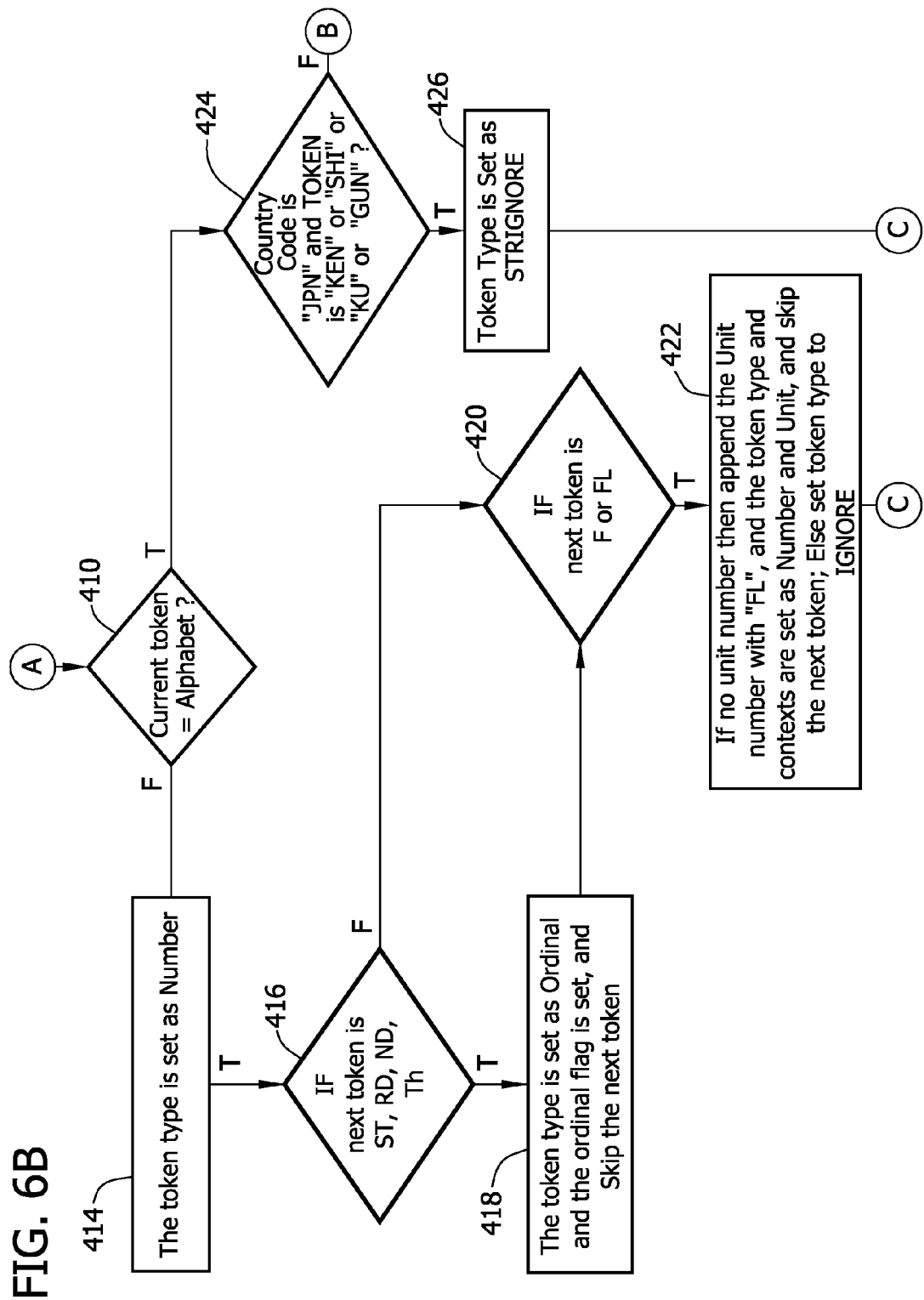

Once separated into tokens, each of the tokens is subjected to the portion of process 400 shown between nodes A and D of FIGS. 6B-6I to create a standardized street address. Each token is processed from left to right to determine the end position of the token and the length of the token. Once the end position and length of the token are determined, the tokens are processed from left to right. Beginning at the left most token, the token is checked to be alpha 410 (FIG. 6B). If the current token is not alpha, the token type for the current token is set to number 414.

Then, if the next token indicates this number is an ordinal (e.g., next token is ST, RD, ND, TH) 416, the token type for the current token is set to ordinal, an ordinal flag is set 418, and the next token is skipped. Once the ordinal flag is set 418, the example process proceeds to decision 420. At this point, if a next token indicates the number designates a floor in a building (e.g., FLOOR, FLR, FL, etc.) 420 and a unit number has not been identified, then the unit number is appended with "FL" and the token type and contexts are set as number and unit, respectively and the next token is skipped 422. If a unit number has already been identified, the token type is set to IGNORE 422. The exemplary process then proceeds to node C.

Figure 6C:
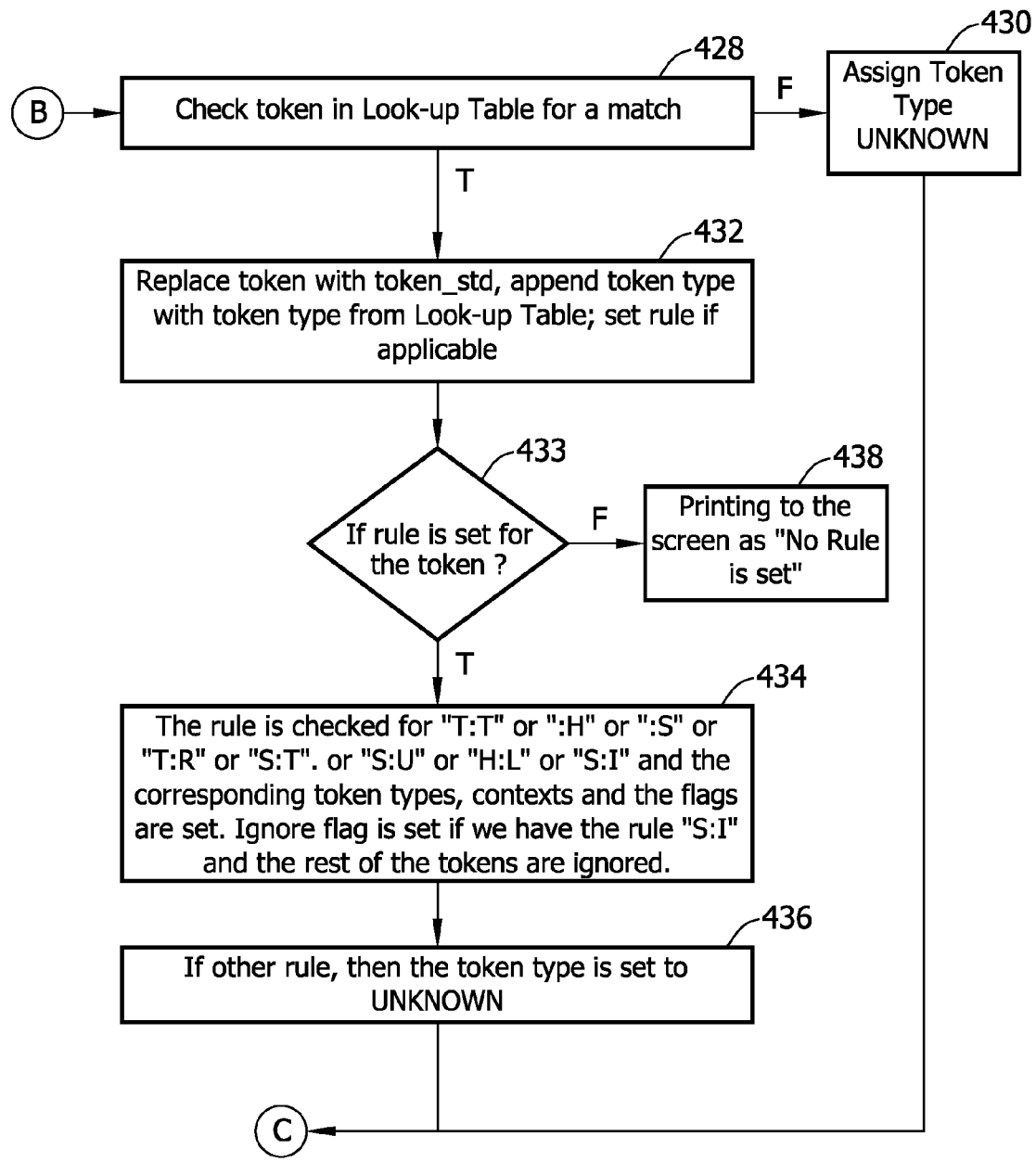

Conversely, if the token is alpha 410, the exemplary process determines 424 if the country code is JPN and the token ends with KEN, SHI, KU, or GUN. If the country code and token match these conditions, the token type of the current token is set to STRIGNORE 426. Alternatively (i.e., these conditions are not met), the current token is searched 428 in a look-up table (FIG. 6C). The search within the look-up table may be limited by the country code referenced above, or may be unlimited. In one example, a search for a language specific or country specific token may be more efficient when limited by the country codes.

An example embodiment of a look-up table is illustrated in FIG. 7 and referenced 600. As shown, table 600 includes columns for country code, token, standard token (i.e., "token_std"), token types and rules. Table 600 includes eighteen (18) tokens listed in alphabetical order. It should be apparent that in other embodiments, a different number of tokens may be included in a look-up table. For example, a table may include hundreds or thousands of tokens. The number of tokens may be selected to provide a sufficient number of tokens to aid in creating the standardized street address, while limiting the number of tokens to make searching within the table efficient. As shown in FIG. 7, table 600 includes a token type for each of the tokens and a rule for several of the tokens.

A token may be searched in the look-up table in a number of different ways. In this particular embodiment, the look-up table is subjected to a binary search. In the binary search, a middle entry of the table is selected and compared to the token. If the token is a match, the search is complete. If, however, the token is not a match, the search determines whether the token is above or below the middle entry—based on an alphabetic or other organization of the look-up table. If the top half is selected, a middle entry in the top half of the look-up table is selected and compared to the token. For each search, the look-up table is cut in half until a match for the token is identified. Once identified, a standard token (including a space) from the look-up table is assigned to the token, a token types associated with the standard token is assigned from the table, and a rule (if any) is set 432 (FIG. 6C). Conversely, if the token is not located within the look-up table, the token is assigned an Unknown type 430, and the process proceeds to node C.

If determined 433 that no rule is set for the token, a "No Rule Set" message is printed 438 to computer 114. If, however, it is determined 433 that a rule is set, the rule is checked against the rules listed in 434. If the rule is present in the list, the rule is executed to set and/or alter tokens, token types, contexts and/or flags accordingly. Otherwise, the token type is set to unknown 436, and the process proceeds to C.

It should be appreciated that different rules may be included in a look-up table to accommodate different types of address formats, locations, countries, regions, languages, etc. Because the rules are token specific, tokens and/or rules may be added, changed or removed from the look-up table, without interfering with other tokens/rules in the look-up table or making changes to the conditions/actions in the process described herein.

As shown in FIG. 6C, in this particular embodiment, an exemplary set of rules is represented by "S:T", "T:T", ":H", ":S", "S:I", which are explained further below. It should be appreciated, however, that the present disclosure is not limited to the exemplary set of rules disclosed herein. In other embodiments, a table may include one or more of the same or different rules, which may implicate standardization of a token, possibly based on location of a token, type/number of character(s) within a token, an adjacent token, a token type, etc.

In the example embodiment of FIG. 5, the look-up table includes an entry for "ST". The rule indicates that if the "ST" is at the beginning, the ST is moved into the street name. However, since the entry contains the rule S:T=ST, if the "ST" is identified and a street name has already been identified, "ST" is replaced by the standard token "ST" and the token type is assigned Type. In another example, the formatted street address may include "Mockingbird Way Av." When searched in the look-up table, the token "WAY" is replaced with standard token WY and the token type is set to Type, because a street name (i.e., Mockingbird) is already stored in street name when the token "Way" is processed. Subsequently, however, when the token "AV" is processed, since the token contains the T:T (SUPERTYPE) rule, the token "Way" is reassigned to the street name and its token type is changed, while the token "AV" is replaced with the standard token "AVE" and the token type is set to Type.

In another example, if a token is "DR", a rule (:S) may direct the token to be assigned to the street name if no street name has been assigned (e.g., Dr. Thompson Ave", etc.). Otherwise, the rule directs the token type to be set to Type. In one additional example, a rule (H:L) may direct the token X to be treated as a number prefix for an Exit, if a highway was previously identified. In yet another example, for the token "NEAR", the look-up table rules (S:I) direct the system to ignore NEAR and everything following NEAR. Often, the word near is followed by a phrase not useful to matching a street address. For example, a raw street address may have included "123 Main St., near Bob's Garage." Once formatted, the token NEAR and the tokens following NEAR may be omitted as meaningless or useless data.

Figure 6D:
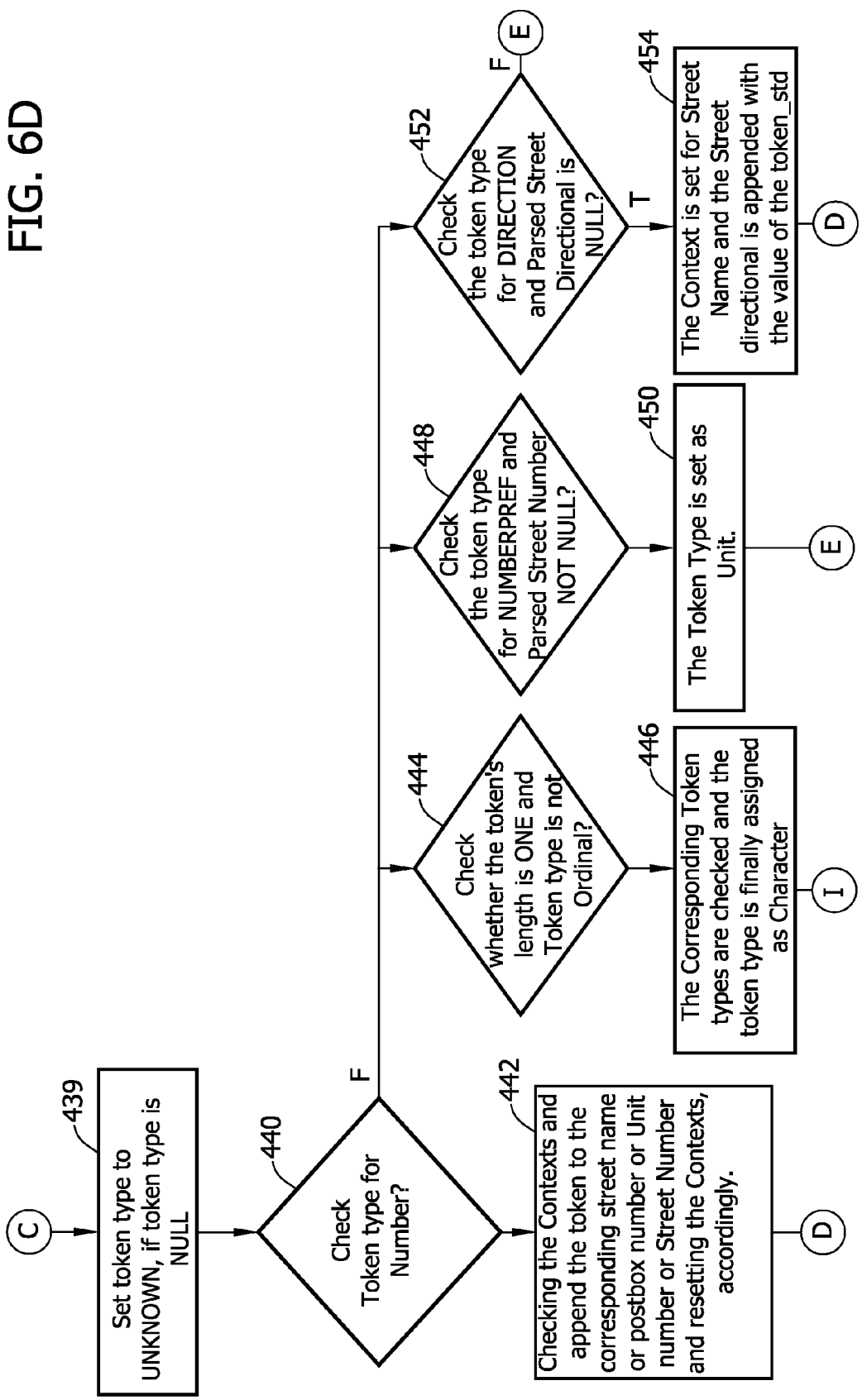
Figure 6E:
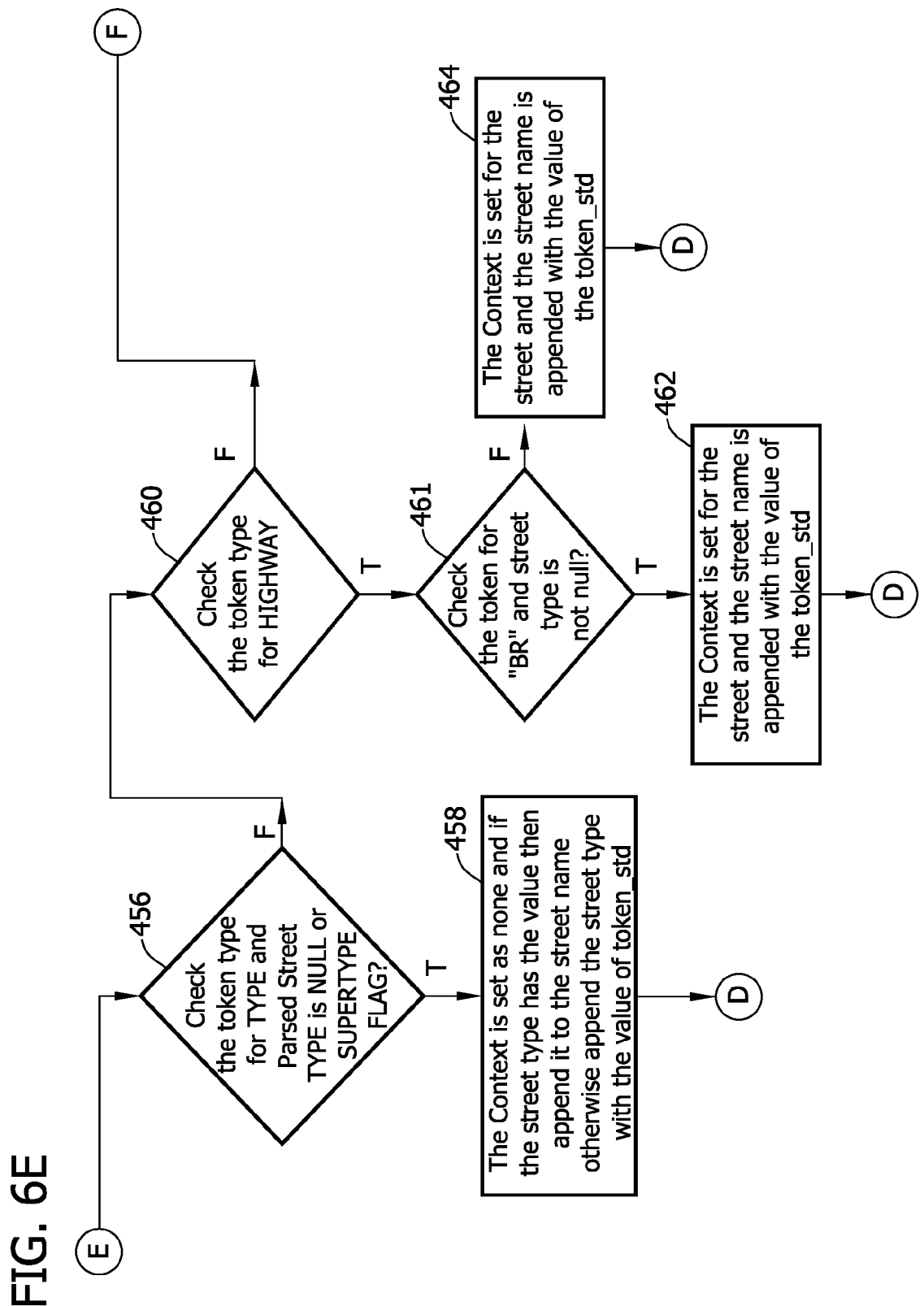

Once the rules are executed, the example process proceeds to node C, which includes setting the token type to UNKNOWN 439 if the token type is NULL (FIG. 6D). The token type is checked 440 for a number. If the token type includes a number, the context of the token is checked and the current token is assigned 442 to the street name, postbox number, unit number, or street number according to the context. For example, if the context is of type box, the token is assigned to be the box number. If the context type is highway, however, the token is assigned to be the highway number. If the context is unit, the token is assigned to be the unit number, unless a unit number already exists and no street number has been assigned, in which case, the token is assigned to be the street number. The example process then proceeds to node D.

If the checked 440 token type is not a number, and the token length is one and the token type is not ordinal 444, the corresponding token types are checked and the token type is finally assigned 446 as characters. Once the token is assigned 446 as character, the example process proceeds to node I. If the checked 440 token type is not a number, and the token type is number prefix and the parsed street number is not NULL 448, the token type is set as unit 450. Once the token type is set to unit 450, the process example proceeds to node E. Alternatively, in some embodiments, the process may be modified to exit from process 450 to process 472, described below. If the checked 440 token type is not a number, and the token type is direction and parsed street number is not NULL 452, the context is set to street name and the street directional is appended with the value of the standard token 454. In this case, the example process then proceeds to node D.

If the token type is not direction and parsed street number is NULL 452, the token type is checked for term type and the parsed street type is NULL, or the SUPERTYPE flag (e.g., rule T:T explained above) is set 456 (FIG. 6E). If the conditions of decision 456 are met, the context is set as none, and if the street type has a value, the value is appended to the street name, otherwise the street type is appended with the value from the standard token 458.

If the conditions of decision 456 are not met, the token type is checked for highway 460. If the token type is highway, the token is checked for BR and the street type is checked for NULL 461. If the token is BR and the street type is not NULL, the context is set for street, and the street name is appended with the value from the standard token 462. If, however, the token is not BR or the street type is NULL 461, the context is set for highway, and the street name is appended with the value from the standard token 464.

Figure 6F:
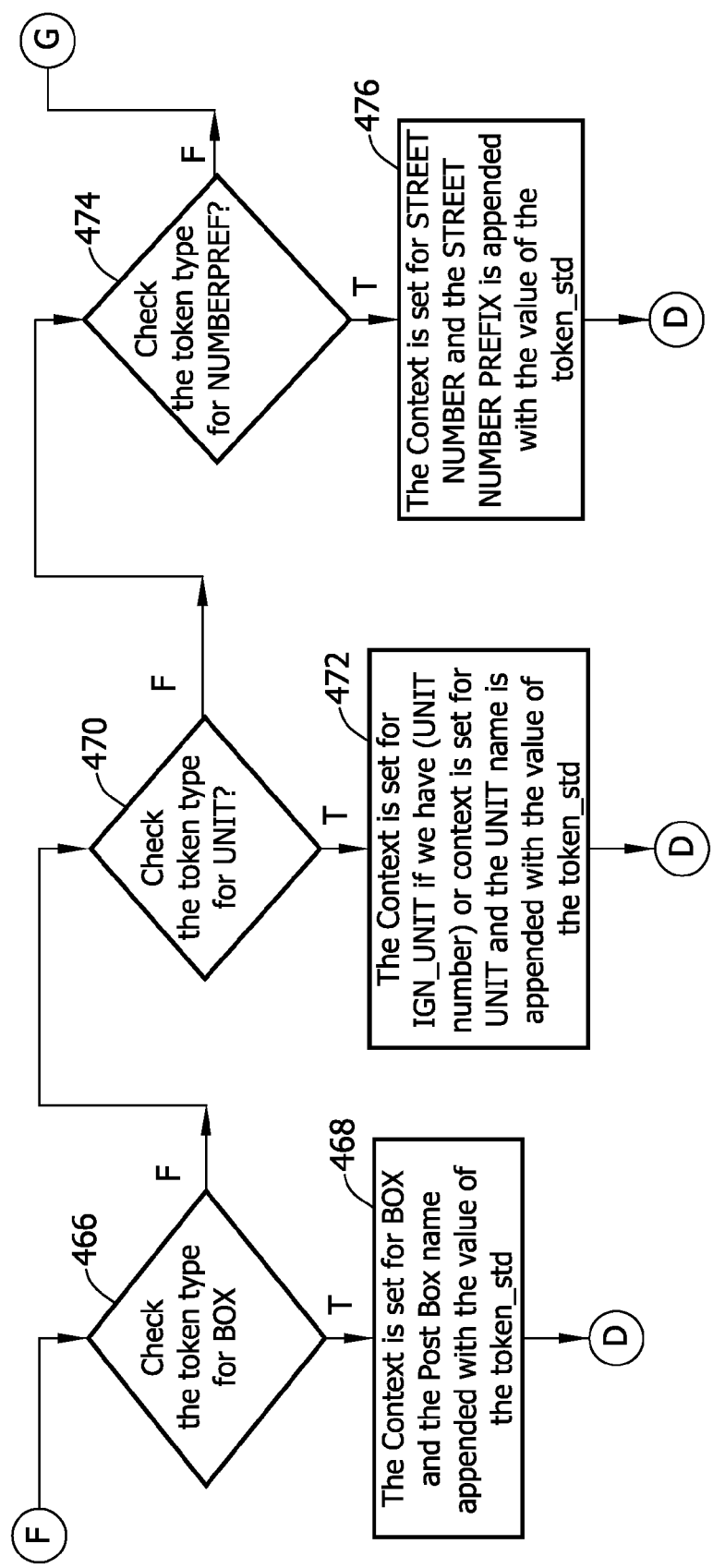
Figure 6I:
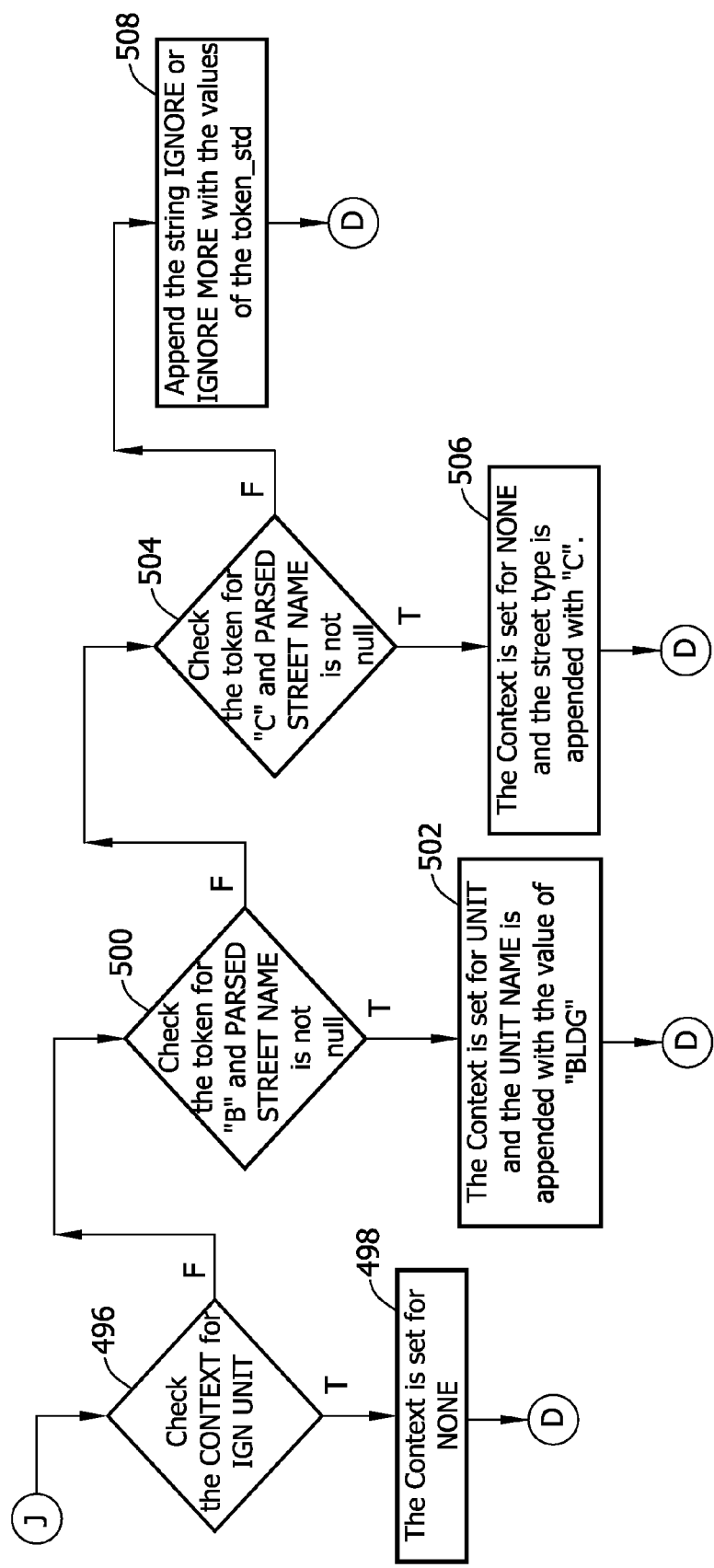

If the token type is not highway 460, the token type is checked for box 466 (FIG. 6F). If the token type is box, the context is set for box, and the post box name is appended with the value from the standard token 468. Otherwise, if the token type is unit 470, the context is set for IGN_UNIT if a unit number has already been appended 472. Alternatively, if no unit number is already appended, the context is set to unit and the unit name is appended with the value from the standard token 472. If the token type is not a unit, but is a number prefix 474, the context is set for street number and the street number prefix is appended with the value from the standard token 476.

With reference to FIG. 6G, if the token type is a street name, Roman numeral, ordinal, or unknown 478, the example process proceeds to decision 480. If a street name, street number and types has been assigned, but the context is not set for street name 480, IGNORE is appended with the value from the standard token 482. Otherwise, the context is set for street name, and the street name is appended with the value from the standard token 484.

If the token type is not a street name, Roman numeral, ordinal, or unknown 478, the token type is checked for character 486 and the example process continued into FIG. 6H. If the token type is character, and the context for street number 488, the context is set for NONE and the street number suffix is appended with the value from the standard token 490. If the context is unit 492, rather than street number, context is set for none, and the unit number is appended with the value from the standard token 494. If the context is an IGN unit 496 (FIG. 6I), the context is set for none 498. If the context is not an IGN unit, the token is checked for "B", and the parsed street name is not NULL, the context is set to unit, and the unit name is appended with the value "BLDG" 502. If condition of decision 500 is not met, the token is checked for "C", and the parsed street name is not NULL 504, the context token is set to none and the street type is appended with "C" 506. If, however, the token is not "C" or the parsed street type is NULL 504, IGNORE (or IGNORE MORE) is appended with the value of the standard token for the current token 508. Specifically, if IGNORE is empty, the value is appended to IGNORE. Conversely, if IGNORE is not empty, the value is appended to IGNORE MORE. From actions 498, 502, 506 and 508, the example process proceeds to node D.

Referring again to FIG. 6G, if the token type was not a character 486, and if the token type is STRIGNORE 510 (FIG. 6H), the context is set for street name, and IGNORE (or IGNORE more) is appended with the value from the standard token 512. If, however, the token type is not STRIGNORE 510, IGNORE (or IGNORE more) is appended with the value from the standard token 514. In each instance, the example process proceeds to node D.

It should be appreciated that creating a standardized address is not limited to the conditions and rules illustrated in the figures and described herein. A different number and/or type of conditions may be included in other embodiments to create a standardized street address. Conditions may be added, altered or subtracted, for example, as process according to the present disclosure support different formats, countries, languages, etc.

Figure 6J:
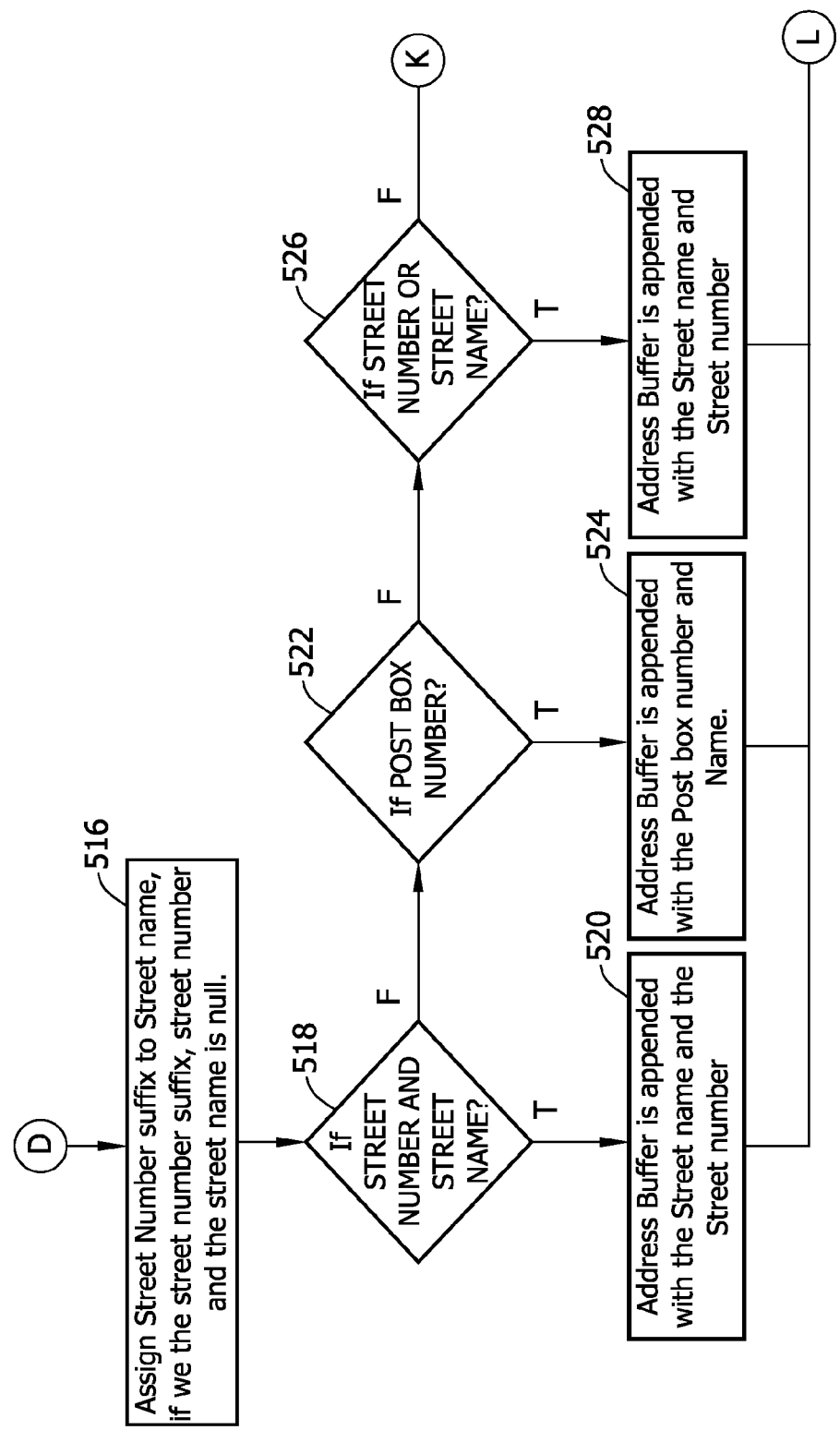

Referring to FIG. 6J, the example process proceeds to append one or more portions of the standardized street address into an address buffer. At the outset, if the street name is null, but the street number and street number suffix are not NULL, the street number suffix is assigned to the street name 516.

Figure 6K:
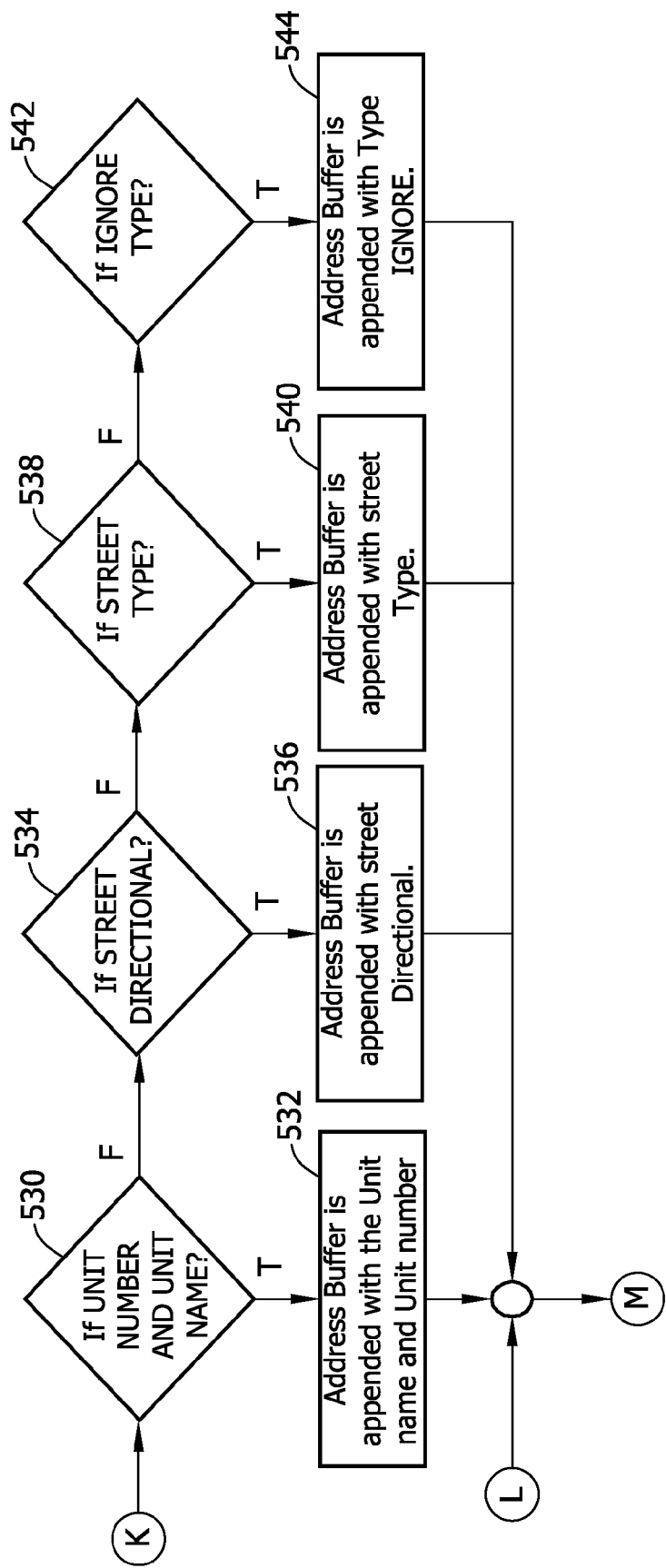

One or more portions of the standardized street address (e.g., street name, street number, unit number, unit name, street direction, street suffix, street number prefix, floor number, etc.) may be appended into the address buffer. FIGS. 6J and 6K include seven conditions for assigning portions of the standardized street address to the address buffer. Specifically, if the street number and street name are present 518, the address buffer is appended to include the street number and street name 520. If either the street number or the street name is NULL, the second condition checks for a post box number 522. If the post box number is present, the address buffer is appended to include the post box number 524. If the post box number is NULL, the third condition checks for either the street number or street name 526. If either is present, the address buffer is appended to include the street number or the street name 528.

If neither the street number nor the street name is present, the fourth condition checks for a unit number and a unit name 530. If present, the address buffer is appended to include the unit number and the unit name 532. If not, the fifth condition checks for a street directional 534. If the street directional is present, the address buffer is appended to include the street directional 536, otherwise the sixth condition checks for a street type 538. If the street type is present, the address buffer is appended to include the street type 540. Finally, the seventh condition checks for the IGNORE type 542. If the IGNORE type is present, the address buffer is appended to include the IGNORE type 544.

It should be appreciated that the number and/or content of the conditions for appending one or more portions of a standardized street address to an address buffer may be different in other embodiments.

Figure 6L:
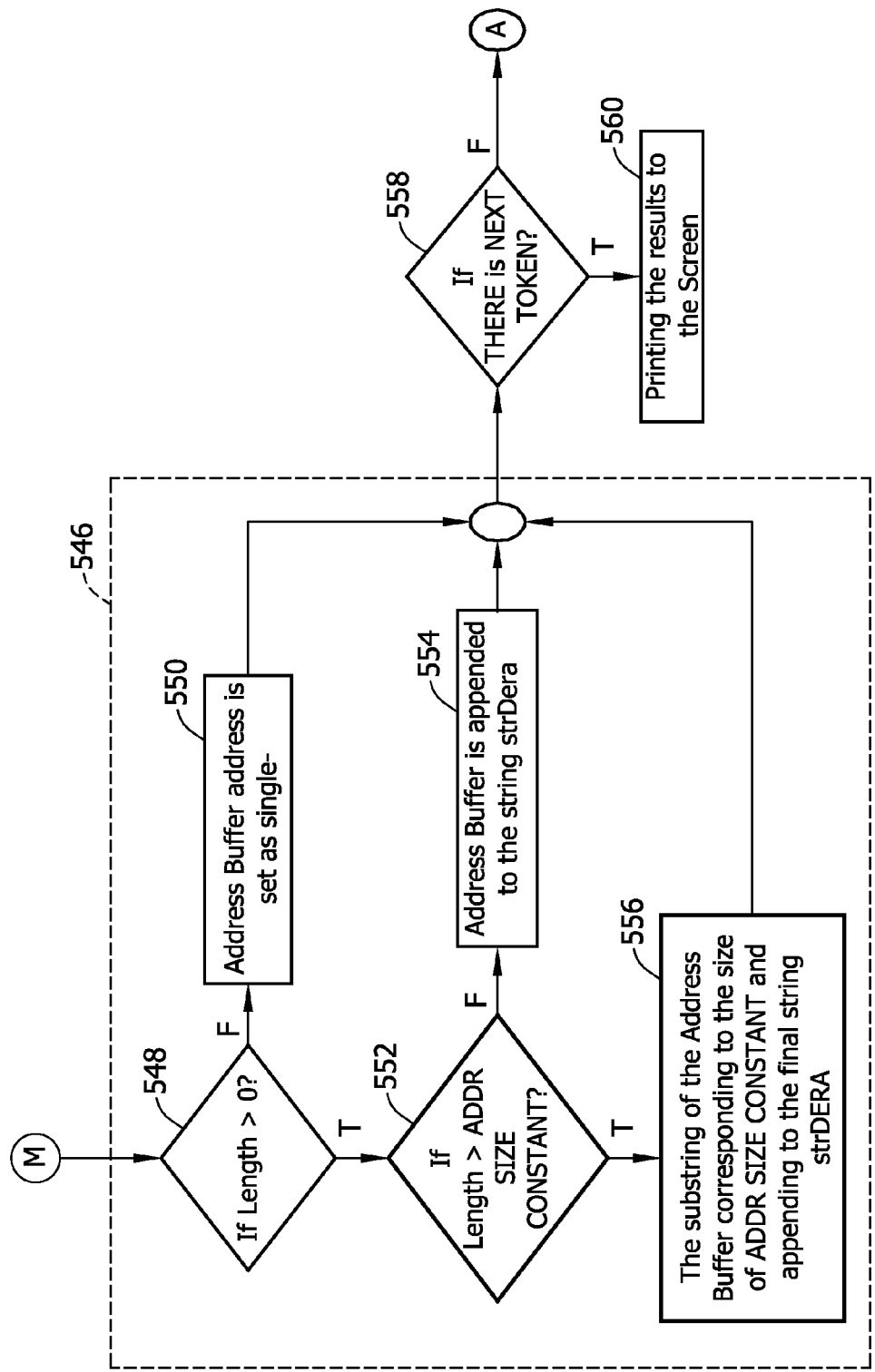

Regardless of which condition appends the address buffer, the example process proceeds through node M to determine the length of the portion of the standardized street address contained in the address buffer 546 (FIG. 6L). If the length is less than zero 548, the address buffer is set as single hyphen 550. If the length is greater than zero, and less than a predetermined constant, the address buffer is appended 554 to strDera in memory 310 for matching with one or more street addresses stored in a merchant database. If, however, the length is greater than the predetermined constant 552, a portion of the address buffer corresponding to the predetermined constant is appended to strDera in memory 310 for matching with one or more street addresses stored in a merchant database. While the length of the standardized street address is limited to the predetermined constant in this embodiment, the length of the standardized street address appended to strDera may be different and/or unlimited in other embodiments.

If the formatted street address includes a next token 558, the example process returns to node A (FIG. 6B) and processes the next token consistent with the above description. Alternatively, the example process prints the contents of strDera to the screen 560.

Once the process 400 of FIG. 6 terminates, the portion of the standardized street address stored in memory, such as "strDera"—along with other raw data (which may be processed or unprocessed)—is compared to standard address data in a merchant database to find a match. The merchant database may be maintained in database 120, memory 210, 310, or another database accessible to the processes disclosed herein. The merchant database may be maintained by a merchant bank, a merchant processor, or other party to a payment-by-card transaction. The merchant database may be the same or different than the database, from which the raw address data was retrieved. Comparing the strDera and one or more standard addresses contained in the merchant database may be performed by one or more methods or processes, including an exact comparison, a substring comparison, a "sounds like" comparison, or other method or process for comparing data.

According to another embodiment of the present invention, one or more computer-readable, non-transitory media comprising a computer-executable program that instructs at least one processor to raw address data, the computer-executable program comprising at least one code segment that instructs the at least one processor to receive raw address data from a database, the raw address data including a raw street address, format the raw street address, separate the formatted street address into at least one token, and create a standardized street address from the at least one token based on one or more conditions. The one or more conditions facilitate determining at least one of indicative of inclusion, exclusion, and position of the at least one token in the standardized street address.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 205 and/or 305, including RAM memory, ROM memory, EPROM memory, EEPROM memory, and non-volatile RAM (NVRAM) memory. The above memory types are exemplary only, and are thus not limiting as to the types of memory usable for storage of a computer program.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-based method for processing raw address data into a standardized street address using a single pass of the raw address data through the process using a computer device coupled to a database, the method comprising:

receiving, at the computer device, raw data from a first party, the raw data including a raw street address;

retrieving a country code from the raw address data;

determining a standardized street address format based on the retrieved country code;

formatting the standardized street address using the determined standardized street address format formatting the raw street address using the computer device, formatting includes inserting a space character between characters of different types;

separating the formatted street address into at least one token using the computer device, each token including one or more characters indicating a portion of the raw street address;

searching for the at least one token in a look-up table, the search limited by the country code;

replacing one of the at least one tokens with a standard token from a lookup table;

operating on the replacement standard token using one or more rules that uses a context of the replacement standard token and an order of appearance of the replacement standard token in the raw street address to correct an incorrect assignment of a street name to the standard token; and creating a standardized street address from the at least one token based on one or more conditions using a single pass of the raw address data through the process, wherein the one or more conditions facilitate determining at least one of inclusion, exclusion, and position of the at least one token in the standardized street address, the one or more conditions are based on the at least one of the at least one token, the at least one token and an adjacent token, a token type of at least one of the at least one token and an adjacent token, and a context of at least one of the at least one token and an adjacent token.

2. The computer-based method of claim 1, wherein formatting the raw street address includes at least one of removing at least one special character, inserting at least one space, and converting a lower-case alpha character to an upper-case alpha character.

3. The computer-based method of claim 1, wherein formatting the raw street address using the computer device comprises:

determining a standardized street address format based on the received raw data; and formatting the standardized street address using the determined standardized street address format.

4. A computer system for processing raw address data into a standardized street address using a single pass of the raw address data through the process, the computer system comprising a memory device and a processor in communication with the memory device, the computer system programmed to:

receive raw address data from a first party, the raw address data including a raw street address;

retrieve a country code from the raw address data;

determine a standardized street address format based on the retrieved country code; and format the standardized street address using the determined standardized street address format and format the raw street address by inserting a space character between different types of characters, the different types of characters including at least one of a numeric type character, an alpha type character, and a non alphanumeric type character;

separate the formatted street address into at least one token, each token including one or more characters indicating a portion of the raw street address;

search for the at least one token in a look-up table, the search limited by the country code;

replace one of the at least one tokens with a standard token from a lookup table; operate on the replacement standard token using one or more rules that uses a context of the replacement standard token and an order of appearance of the replacement standard token in the raw street address to correct an incorrect assignment of a street name to the standard token; and create a standardized street address from the at least one token based on one or more conditions, wherein the standardized street address includes data from the raw address data in consistent positions and excludes data that is inconsistent with predetermined standardized data, and wherein the one or more conditions facilitate determining at least one of indicative of inclusion, exclusion, and position of the at least one token in the standardized street address, the one or more conditions are based on the at least one of the at least one token, the at least one token and an adjacent token, a token type of at least one of the at least one token and an adjacent token, and a context of at least one of the at least one token and an adjacent token.

5. The computer system of claim 4, wherein said computer system is programmed to at least one of remove at least one special character, insert at least one space, and convert a lower-case alpha character to an upper-case alpha character.

6. One or more non-transitory computer-readable storage media having computer-executable instructions embodied thereon, wherein when executed by at least one processor, the computer-executable instructions cause the processor to:

receive raw address data from a first party, the raw address data including a raw street address;

retrieve a country code from the raw address data;

determine a standardized street address format based on the retrieved country code; and format the standardized street address using the determined standardized street address format and format the raw street address by inserting a space character between different types of characters, the different types of characters including at least one of a numeric type character, an alpha type character, and a non alphanumeric type character;

separate the formatted street address into at least one token, each token including one or more characters indicating a portion of the raw street address;

search for the at least one token in a look-up table, the search limited by the country code;

replace one of the at least one tokens with a standard token from a lookup table;

operate on the replacement standard token using one or more rules that uses a context of the replacement standard token and an order of appearance of the replacement standard token in the raw street address to correct an incorrect assignment of a street name to the standard token; and create a standardized street address from the at least one token based on one or more conditions, wherein the standardized street address includes data from the raw address data in consistent positions and excludes data that is inconsistent with predetermined standardized data, and wherein the one or more conditions facilitate determining at least one of indicative of inclusion, exclusion, and position of the at least one token in the standardized street address, the one or more conditions are based on the at least one of the at least one token, the at least one token and an adjacent token, a token type of at least one of the at least one token and an adjacent token, and a context of at least one of the at least one token and an adjacent token, where the processor processes the raw address data into a standardized street address using a single pass of the raw address data through the process.

7. The computer-readable storage media of claim 6, wherein the computer-executable instructions further cause the processor to at least one of remove at least one special character, insert at least one space, and convert a lower-case alpha character to an upper-case alpha character.

8. The computer-readable storage media of claim 6, wherein the computer-executable instructions further cause the processor to:

determine a standardized street address format based on the received raw data; and format the standardized street address using the determined standardized street address format.

* * * * *